United States Patent [19]

Smith et al.

[11] Patent Number: 5,641,192
[45] Date of Patent: Jun. 24, 1997

[54] AERODYNAMIC LIGHTWEIGHT FLEXIBLE FLATBED TOP

[76] Inventors: Duane Smith, 17795-22nd St., Mayer, Minn. 55360; Chris A. Butler, 210 West Point Dr., Tonka Bay, Minn. 55331

[21] Appl. No.: 414,485

[22] Filed: Mar. 31, 1995

[51] Int. Cl.$^6$ ........................................ B60P 7/02
[52] U.S. Cl. ................. 296/100; 52/653.2; 135/88.13; 135/117; 135/119; 160/243; 296/104; 296/141
[58] Field of Search ................................. 296/100, 141, 296/104, 106; 135/117, 115, 88.13, 88.01, 88.15, 88.18, 119, 96; 52/63, 646, 653.1, 653.2; 160/243, 368.1, 56, 77

[56] References Cited

U.S. PATENT DOCUMENTS

| | | | |
|---|---|---|---|
| 2,806,477 | 9/1957 | Fritsche | 135/117 X |
| 3,456,765 | 7/1969 | Dietz | 135/117 X |
| 4,902,064 | 2/1990 | Tuerk et al. | 296/100 |
| 5,338,084 | 8/1994 | Wardell | 296/100 X |

FOREIGN PATENT DOCUMENTS

| | | | |
|---|---|---|---|
| 848859 | 9/1952 | Germany | 135/88.13 |
| 0067418 | 3/1989 | Japan | 296/100 |

*Primary Examiner*—David M. Mitchell
*Assistant Examiner*—Kia M. Robinson
*Attorney, Agent, or Firm*—Palmatier, Sjoquist, Helget & Voigt, P.A.

[57] ABSTRACT

An aerodynamic, lightweight, flexible material top for enclosing a flatbed of a wheeled vehicle having a front and rear, the top includes a series of inverted, U-shaped supports extending upwardly from and across the flatbed with a first support at the front and a last support at the rear. A flexible material is stretched over the supports and includes a fixed sleeve and a laterally adjustable sleeve which are secured about the first and last supports. At least a portion of the top is pivotally connected as to swing upwardly away from the flatbed to gain access under the top and to the flatbed.

20 Claims, 4 Drawing Sheets

AERODYNAMIC LIGHTWEIGHT FLEXIBLE FLATBED TOP

BACKGROUND OF THE INVENTION

The present invention relates to tops for flatbeds of trailers or motorized vehicles, and more particularly to an aerodynamic, lightweight, flexible material top for enclosing a flatbed.

Flatbeds are common in vehicles. Generally the flatbed of a trailer or motorized vehicle includes a horizontal surface without walls or ceiling. The advantage to flatbeds is that they permit the transport of any of a variety of structures or devices without concern for adequate side or vertical space because walls and ceiling are generally nonexistent on a flatbed.

Another significant advantage of flatbeds is they are relatively lightweight with the absence of a ceiling and sidewalls and are commonly made of heavy, rigid structures. Furthermore, with the absence of sidewalls and ceilings, flatbeds are relatively economical to purchase and more economical to transport without the significant and weighty sidewalls and ceiling.

There is a need for an aerodynamic, lightweight trailer top for enclosing a flatbed of a trailer or motorized vehicle. Such a top should be economical to manufacture and provide easy access to the flatbed.

SUMMARY OF THE INVENTION

An aerodynamic, lightweight, flexible material top for enclosing a flatbed of a wheeled vehicle having a front and rear, the top includes a series of inverted, U-shaped supports extending upwardly from and across the flatbed with a first support at the front and a last support at the rear. A flexible material is stretched over the supports and includes a fixed sleeve and a laterally adjustable sleeve which are secured about the first and last supports. At least a portion of the top is pivotally connected as to swing upwardly away from the flatbed to gain access under the top and to the flatbed.

A principal object and advantage of the present invention is that the top is of a lightweight, flexible material construction that typically would weigh less than three hundred pounds for a twenty foot trailer or vehicle as to not add significantly to the towing weight.

Another object and advantage of the present invention is that the top's nose cone is aerodynamic in design which permits easy towing down the highway without significant fuel consumption apart from the lightweight structure and design of the top.

Another object and advantage of the present invention is that the top is relatively inexpensive when compared to a trailer or wheeled vehicle having fixed sidewalls and ceiling.

Another object and advantage of the present invention is that the top may be readily removed from the flatbed by the simple withdrawal of nuts and bolts holding the top to the short flatbed sidewalls.

Another object and advantage of the present invention is that the aerodynamically designed nose cone is pivotally mounted as to swing upwardly much like the nose cone of a cargo plane to permit easy access into and out of the top and flatbed.

Other objects and advantages will become readily apparent upon review of the following figures, specification and appended claims.

DETAILED SPECIFICATION

Figure 1:
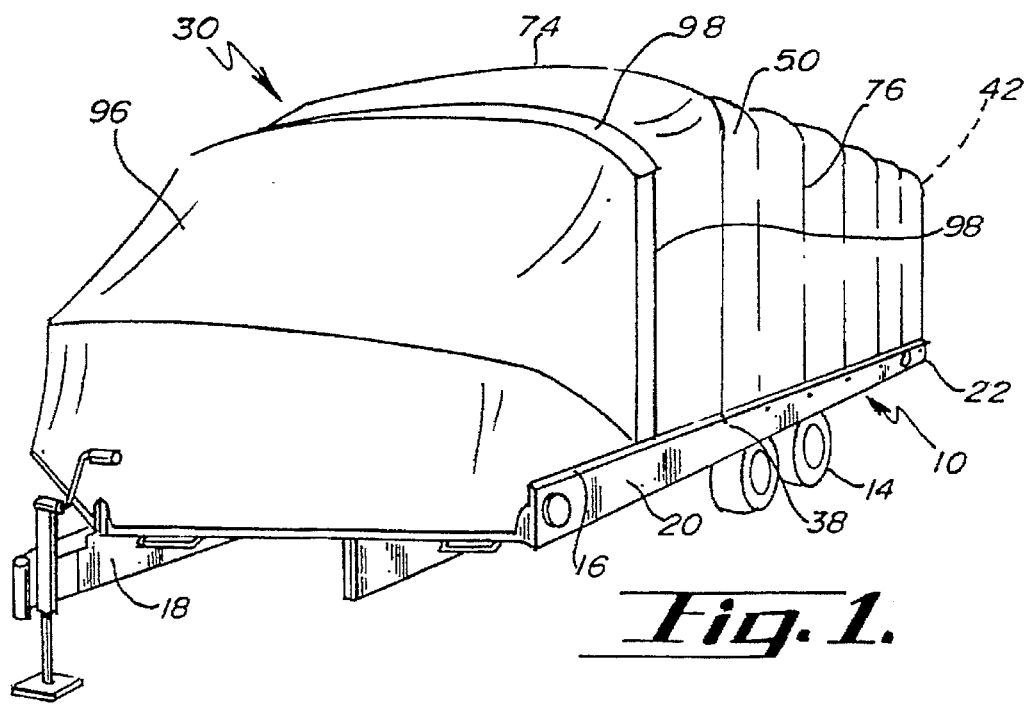
FIG. 1 is a from perspective view of the invention on a flatbed vehicle.

Referring to FIGS. 1-4, a flatbed trailer or vehicle 10 may be seen. The vehicle 10 may also be self-propelled or motorized. The trailer 10 includes a flatbed 12 which is transportable by wheels 14 being supported from underneath suitably by axles as is well known. Short sidewalls 16 for freight securement are common on flatbed 12. The trailer 10 is typically towable by way of a yoke 18, while the trailer 10 may be described to have a front 20 and a rear 22.

Referring to FIGS. 1-4 and 9, the aerodynamic, lightweight, flexible material trailer top 30 may generally be understood. The top 30 includes inverted U-shaped supports 32 affixed to the flatbed 12 overwhich a flexible material 50, such as canvas or another waterproof fabric, is secured by a fixed sleeve 72 and a laterally adjustable open sleeve 82. The top 30 has an open rear 52 closable with a door 58 and a pivotally connected portion or sloping nose cone 96 which is mounted to the top 30 by a hinge 122.

Figure 5:
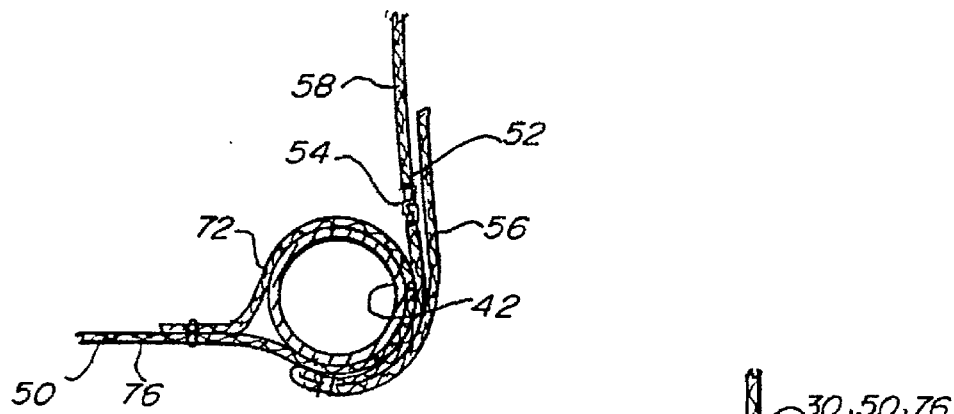
FIG. 5 is a broken away cross sectional view taken along lines 5—5 of FIG. 4.
Figure 6:
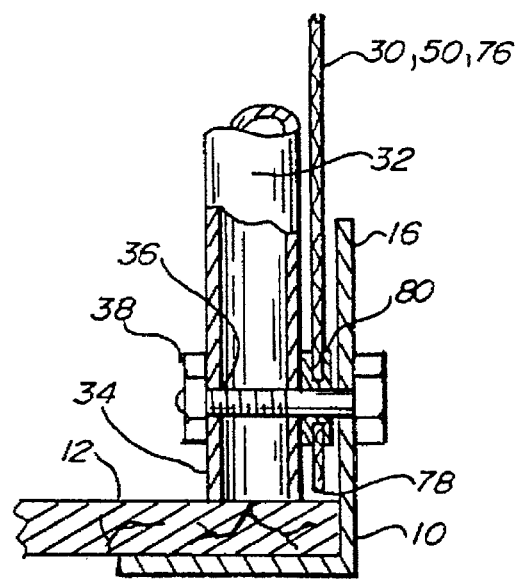
FIG. 6 is a broken away cross sectional view taken along lines 6—6 of FIG. 4.
Figure 7:
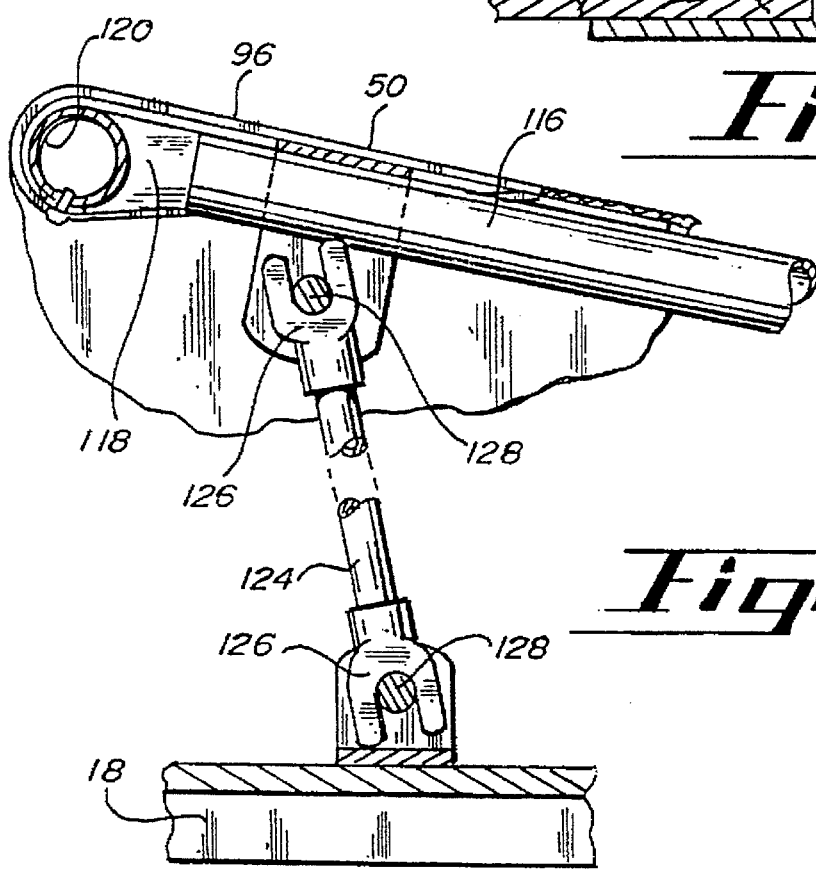
FIG. 7 is a broken away view showing the nose cone support rod.

Referring to FIGS. 1-9, the details of the top 30 will now be discussed. The top 30 has a series of inverted, U-shaped supports 32 which suitably may be of bent tubes made of aluminum or stainless steel. The supports 32 have bottom ends 34 (FIG. 6). The bottom ends 34 each have an aperture 36 therethrough which will receive an arrangement of a nut and bolt 38 for securing the inverted, U-shaped support 32 to the short sidewalls 16 of the vehicle or trailer 10. The U-shaped supports 32 suitably have a first or front support 40 and a last or rear support 42 having intermediate portions 44. Supporting the front and rear supports 40 and 42 from collapsing inwardly are opposing struts 46 secured as is well known by nuts and bolts or plastic fittings.

Figure 9:
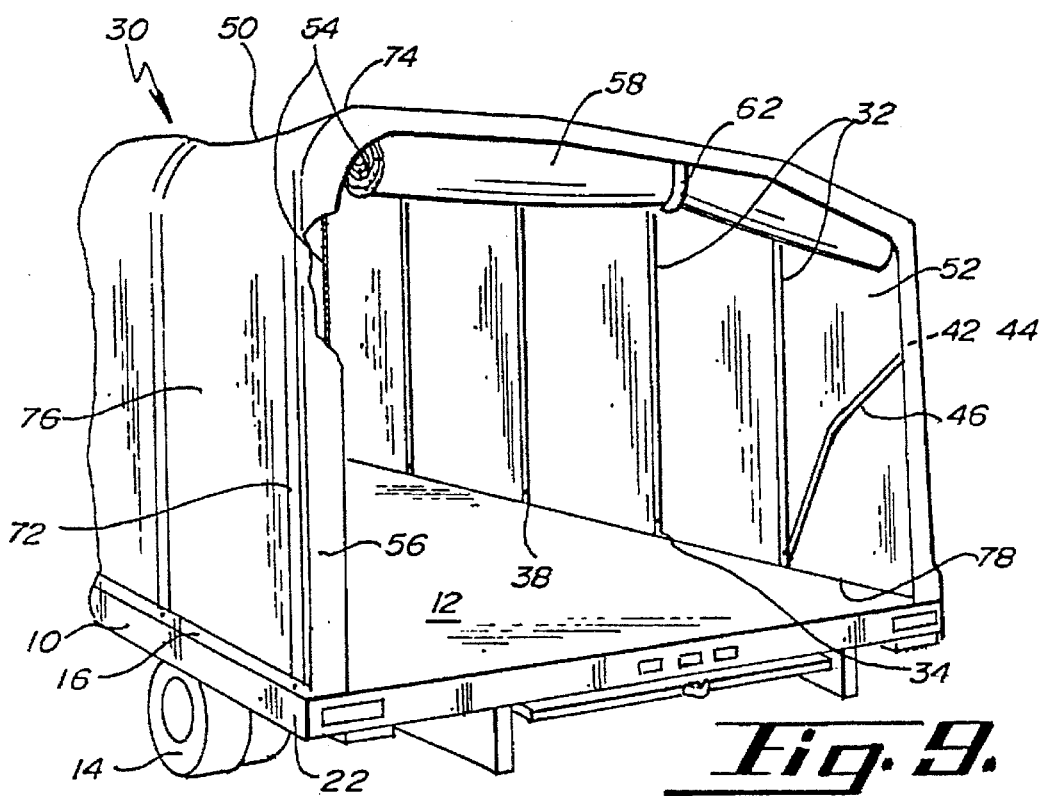
FIG. 9 is a broken away rear perspective view with the rear door open.

Over the inverted, U-shaped supports 32 is positioned the flexible material 50 having an open rear 52 suitably with a zipper 54 therearound and an overlapping flap 56. Thereat is a flexible door 58. At the upper portion of door 58 is an upper VELCRO® 62 (hook and loop material as is well known) which will support the door 58 in its upwardly open position (FIG. 9). At the bottom of door 58 is a bottom sleeve 64 wherein is supported a metal tube 66 which aids holding the door 58 in a closed position. Extending about metal tube 66 from sleeve 64 is a stretch cord 68 which appropriately may be wrapped around a portion of the trailer to hold the door 58 in a downwardly secured position by action of the stretch cord about the metal tube 66 captured in bottom sleeve 64. At the lower sides of door 58 are located VELCRO® tabs 70 which secures the side portions of door 58 in a closed position to further aid zipper 54.

Generally, the flexible material 50 includes a ceiling 74 and sidewalls 76 with a bottom edge 78. Along bottom edge 78 are located grommets 80 for securement to the short sidewalls 16 of flatbed 12 by nuts and bolts 38 passing therethrough (FIG. 6).

Figure 8:
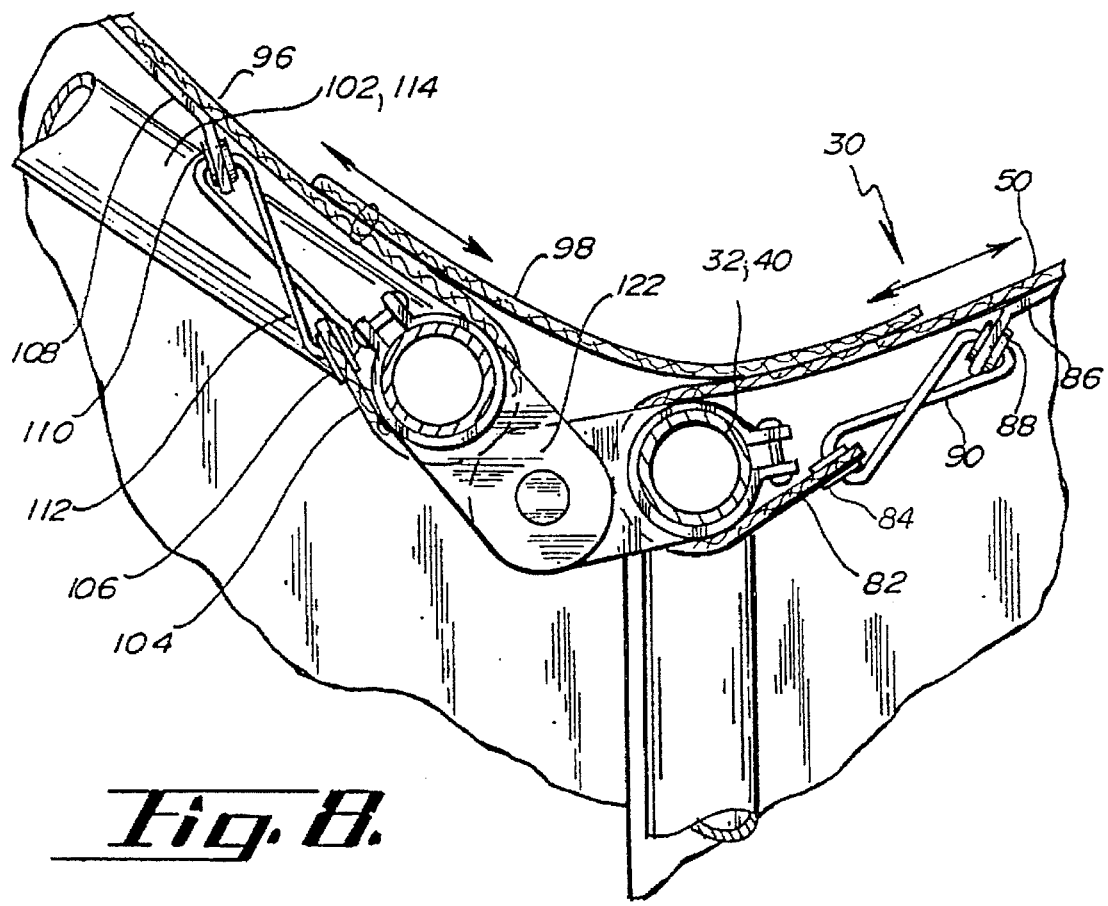
FIG. 8 is a broken away cross sectional view taken along lines 8—8 of FIG. 2.

The flexible material 50 is secured about the U-shaped supports 32 by way of the rearward fixed sleeve 72 capturing the last or rear support 42 (FIG. 5). Forwardly is located the laterally adjustable open sleeve 82 which captures the first or front support 40. The adjustable sleeve 82 may be adjusted along the double headed arrow as shown in FIG. 8. The adjustable sleeve 82 has grommets 84 which oppose grommets 88 on tab 86. A cord 90 is interlooped with grommets 84 and 88 which permit the lateral tension along the double headed arrow to ensure a tight fit of flexible material about the U-shaped supports 32. The outside forward edge of the flexible material 50 appropriately has VELCRO® 92 therealong.

Figure 2:
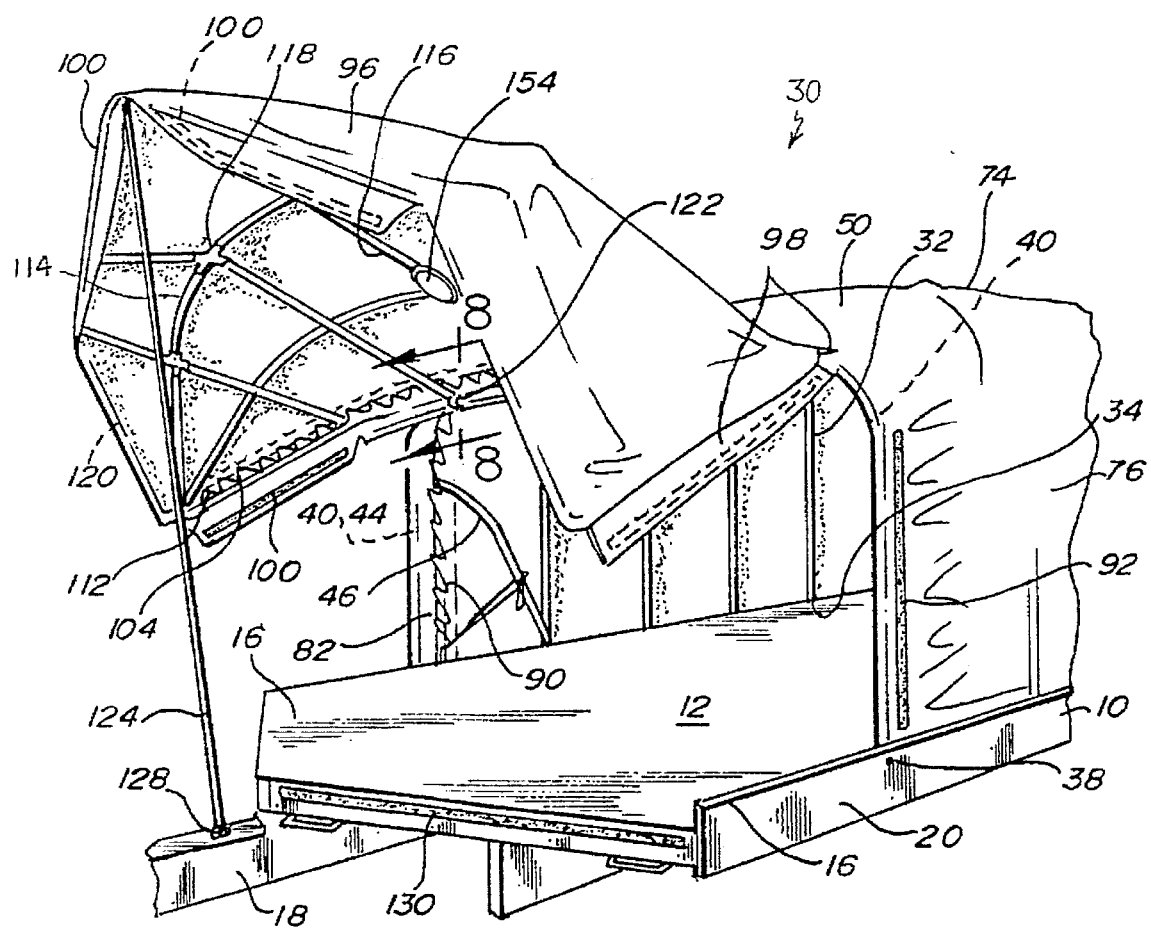
FIG. 2 is a broken away front perspective view with the nose cone open.

Referring to FIGS. 1, 2 and 8, the pivotally connected portion or sloping nose cone 96 may be appreciated. The nose cone 96 has an outer flap 98 which appropriately may support VELCRO® 100 to cooperate with the outside forward edge VELCRO® 92 of the flexible material 50. The nose cone 96 includes a rear support 102 whereabout is located a laterally adjustable open sleeve 104 supporting grommets 106 and opposing tab 108 with grommets 110. A cord 112 suitably interloops with grommets 106 and 110 to tightly secure the nose cone 96 to the inverted, U-shapes supports 114. Supports 114 may also have lateral struts 116 connected thereto appropriately by plastic connectors. A forward bottom support 120 captured in a sleeve-like sleeve 72 is also present for rigidly securing the bottom front material portion of the nose cone 96 and for securing the nose cone 96 to the front portion 20 of the flatbed 12.

Nose cone 96 is supported by hinge 122 to the remainder of the inverted, U-shapes supports 32. With the nose cone 96 in its upward position, a nose cone support rod 124 supporting U-shaped ends may be secured to support pins 128 located on the yoke 18 and adjacent the forward bottom support 120. VELCRO® 130 may be located on the forward edge of the front 20 of the flatbed 10 for securing the nose cone 96 in its downward position and matching engagement with VELCRO® 100 on the outer flap 98.

Figure 3:
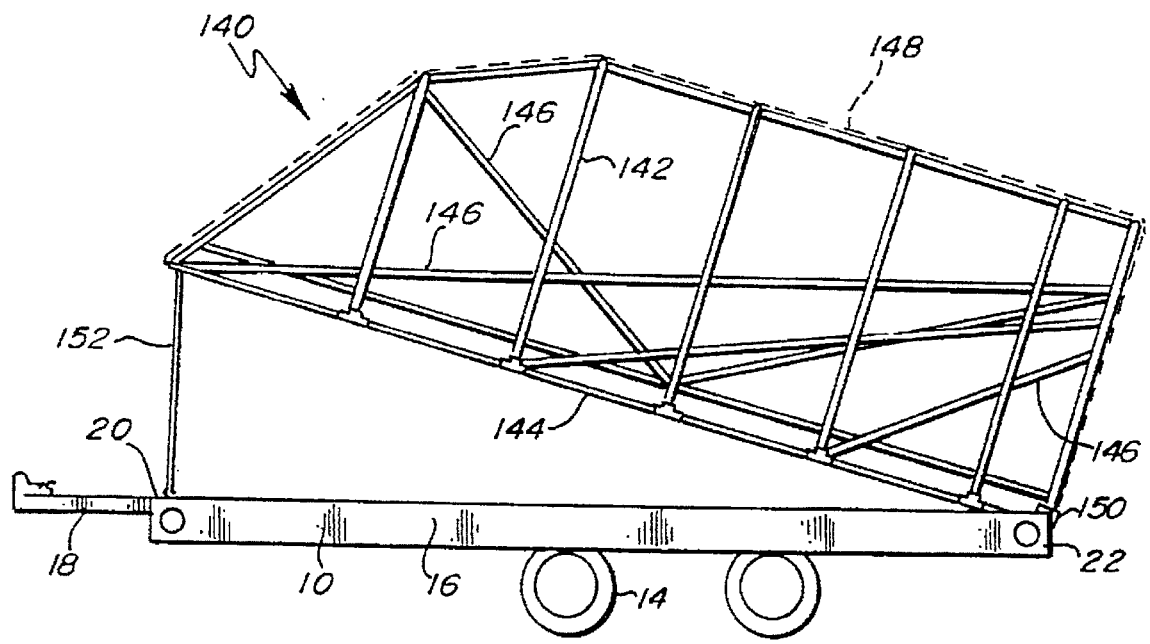
FIG. 3 is a side elevational view of a second embodiment of the invention.
Figure 4:
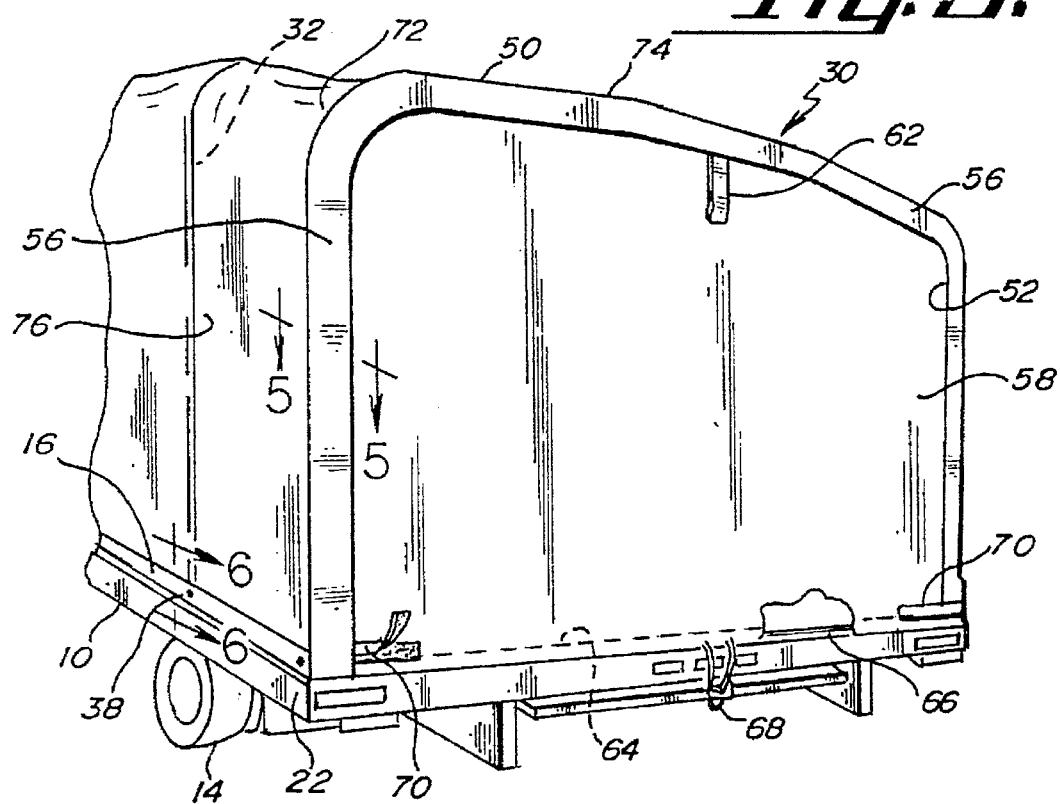
FIG. 4 is a broken away rear perspective view of the invention on a flatbed vehicle.

Referring to FIG. 3, slightly modified one piece, aerodynamic, lightweight trailer top 140 may be seen. The top 140 comprises inverted, U-shaped supports 142 with a bottom support frame 144. Opposing struts 146 provide lateral support between the U-shaped supports 142. Flexible material 148 is appropriately fitted about the U-shaped supports 142 as previously described. In this embodiment, the pivot hinge 150 is located at the rear 22 of the flat bed which permits the trailer top 140 to be lifted upwardly from the front portion and a support rod 152 will support the top thereat. Lights 154 may also be placed within the trailer top 140 or 30.

In operation, the rear opening 52 may be opened by releasing the side VELCRO® 70 and opening the zipper 54. The door 58 with its metal tube 66 therein may then be rolled up and secured in an open position by upper VELCRO® tab 62.

Referring to the front portion 20 of the flatbed 12, the outer flap 98 of the nose cone 96 may be lifted up as to separate the VELCRO® 100 from VELCRO® 130 on the trailer 10 and VELCR0® 92 on the flexible material 50. By action of the hinges 122, the nose cone 96 may be lifted upwardly and the nose cone support rod 124 may be placed into position to hold the nose cone 96 in an open condition. Closure of the flatbed trailer top 10 would simply follow the reverse procedure.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. An aerodynamic, lightweight trailer top for enclosing a flat bed trailer with a front and a rear, the top comprising:
   (a) a series of inverted U-shaped supports extending upwardly from and across the flat bed with a first support at the front and a last support at the rear;
   (b) a flexible material with means for stretching and securing the material over the supports and to the flat bed to form the trailer top wherein the means for stretching and securing the material over the supports comprises a portion of the material forming a fixed sleeve and a laterally adjustable sleeve, the sleeves being secured about the first and last U-shaped supports; and
   (c) at least a portion of the trailer top being pivotally connected as to swing upwardly away from the flat bed to gain access under the top and to the flat bed, wherein the pivotally connected portion of the trailer top comprises a downwardly sloping non-collapsible nose cone at the front of the trailer, the nose cone being securable to the front of the trailer.

2. The top of claim 1, further comprising opposing struts connecting the flat bed and intermediate portions of the first and last supports.

3. The top of claim 1, wherein the fixed sleeve is closed and the laterally adjustable sleeve is open and securable by adjustable connection with connectors to the material.

4. The top of claim 1, wherein the nose cone overlaps the non-pivotally connected top portion.

5. The top of claim 1, wherein the trailer top has a flexible door at the rear of the trailer.

6. The top of claim 1, wherein the trailer top is pivotally connected to the rear of the trailer and securable to the front of the trailer.

7. The top of claim 1, wherein both the supports and the material are secured together to the flat bed.

8. An aerodynamic, lightweight trailer top for enclosing a flat bed trailer with a front and a rear, the top comprising:
   (a) a series of inverted U-shaped supports extending upwardly from and across the flat bed with a first support at the front and a last support at the rear;
   (b) a flexible material with means for stretching and securing the material over the supports and to the flat bed to form the trailer top wherein the means for stretching and securing the material over the supports comprises a portion of the material forming a fixed sleeve and a laterally adjustable sleeve, the sleeves being secured about the first and last U-shaped supports; and
   (c) at least a portion of the trailer top being pivotally connected as to swing upwardly away from the flat bed without collapsing to gain access under the top and to the flat bed.

9. The top of claim 8, further comprising opposing struts connecting the flat bed and intermediate portions of the first and last supports.

10. The top of claim 8, wherein the fixed sleeve is closed and the laterally adjustable sleeve is open and securable by adjustable connection with connectors to the material.

11. The top of claim 8, wherein the pivotally connected portion of the trailer top comprises a downwardly sloping nose cone at the front of the trailer, the nose cone being securable to the front of the trailer.

12. The top of claim 11, wherein the nose cone overlaps the non-pivotally connected top portion.

13. The top of claim 8, wherein the trailer top has a flexible door at the rear of the trailer.

14. The top of claim 8, wherein the trailer top is pivotally connected to the rear of the trailer and securable to the front of the trailer.

15. The top of claim 8, wherein both the supports and the material are secured together to the flat bed.

16. An aerodynamic, lightweight trailer top for enclosing a flat bed trailer with a front and a rear, the top comprising:

(a) a series of inverted U-shaped supports extending upwardly from and across the flat bed with a first support at the front and a last support at the rear;

(b) opposing struts connecting the flat bed and intermediate portions of the first and last supports;

(c) a flexible material with means for stretching and securing the material over the supports and to the flat bed to form the trailer top, wherein the means for stretching and securing the material over the supports comprises a portion of the material forming a fixed sleeve and a laterally adjustable sleeve, the sleeves being secured about the first and last U-shaped supports; and (d) at least a portion of the trailer top forming a downwardly sloping non-collapsible nose cone at the front of the trailer being pivotally connected as to swing upwardly away from the flat bed to gain access under the top and to the flat bed and being securable to the front of the trailer.

17. The top of claim 16, wherein the trailer top has a flexible door at the rear of the trailer.

18. The top of claim 16, wherein both the supports and the material are secured together to the flat bed.

19. The top of claim 16, wherein the nose cone overlaps the non-pivotally connected top portion.

20. The top of claim 16, wherein the fixed sleeve is closed and the laterally adjustable sleeve is open and securable by adjustable connection with connectors to the material.

\* \* \* \* \*